Dec. 19, 1939.  A. P. FALL  2,184,181
ARM REST FOR MOTOR VEHICLES
Filed June 15, 1938   2 Sheets-Sheet 1
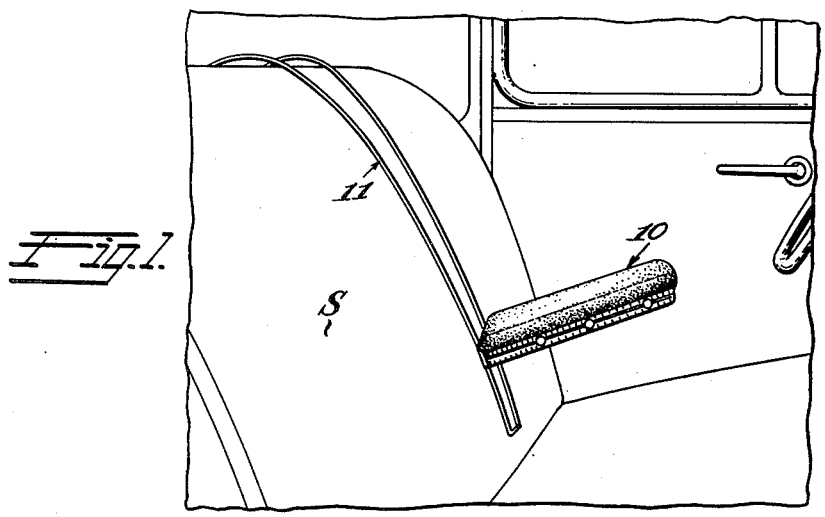
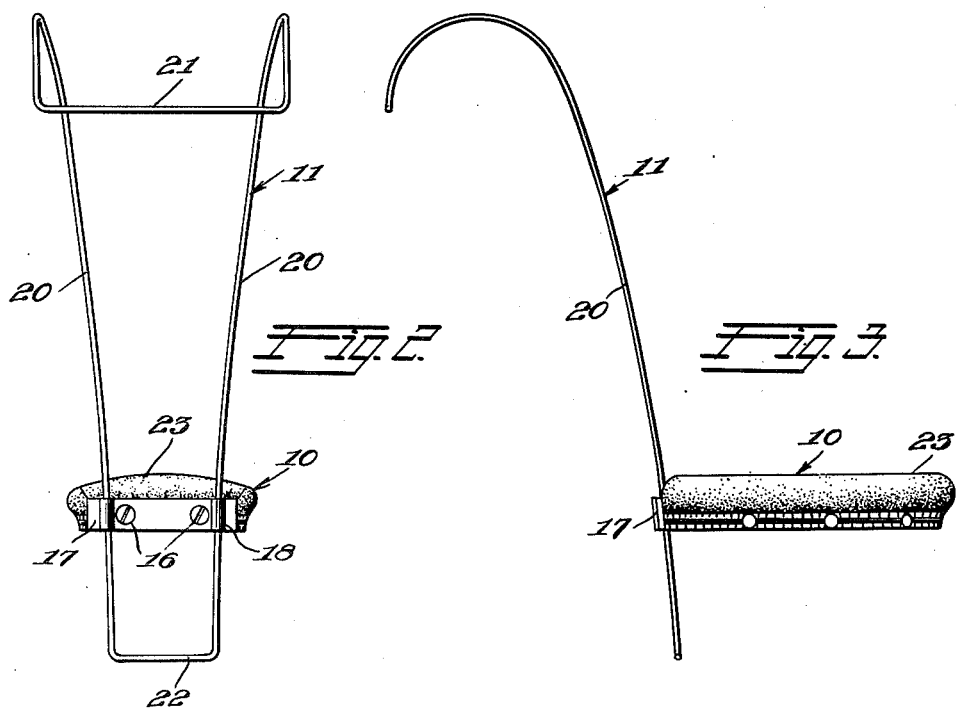
Inventor
Albert P. Fall.
By George E. Cook.
Attorney Dec. 19, 1939.  A. P. FALL  2,184,181
ARM REST FOR MOTOR VEHICLES
Filed June 15, 1938  2 Sheets-Sheet 2
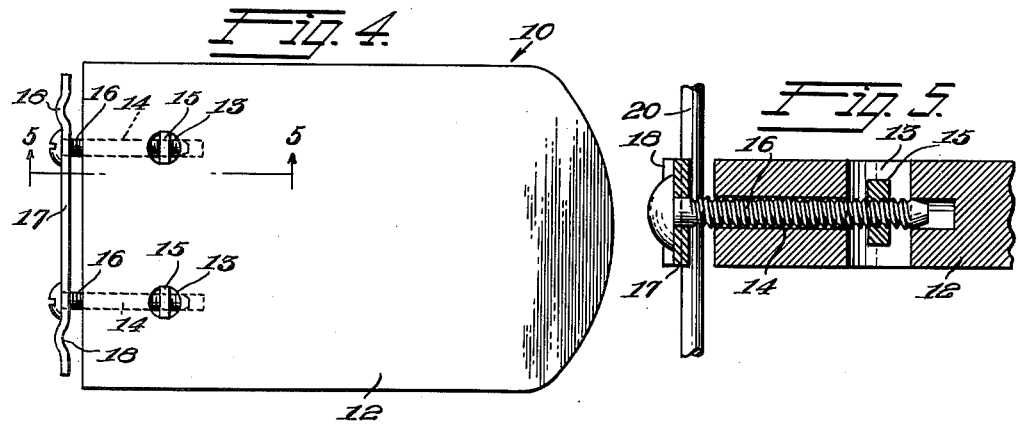
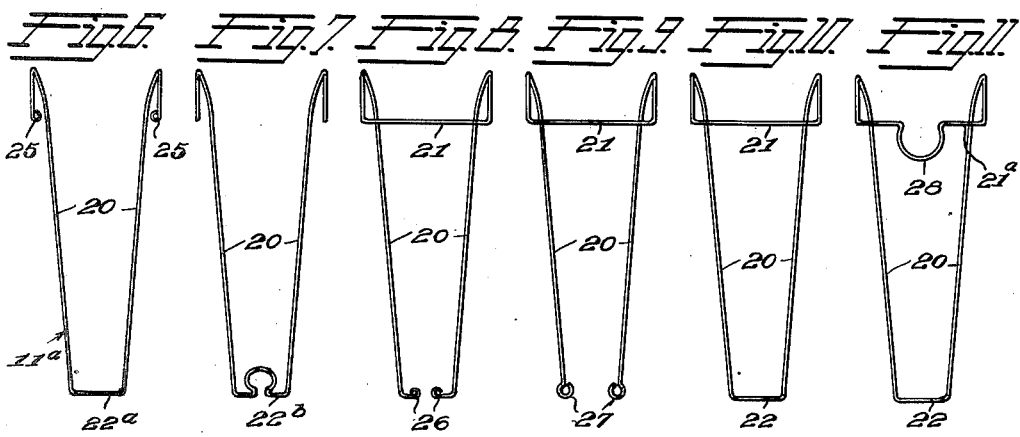
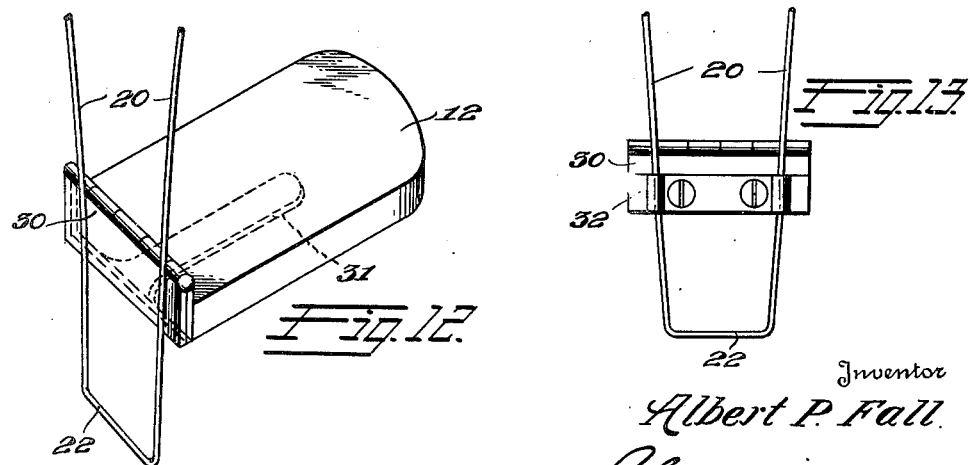
Inventor
Albert P. Fall
By George E. Cook
Attorney Patented Dec. 19, 1939

2,184,181

UNITED STATES PATENT OFFICE 2,184,181

ARM REST FOR MOTOR VEHICLES

Albert P. Fall, Toledo, Ohio

Application June 15, 1938, Serial No. 213,915

2 Claims. (Cl. 155—112)

This invention relates to arm rests for motor vehicles.

Motor vehicle arm rests of various forms have heretofore been proposed and used but they have in large measure failed to offer maximum convenience and comfort to occupants of the vehicle, due to the fact that they were either permanently mounted in fixed positions or were adapted for removable mounting in restricted locations on the body of the vehicle.

It is a primary object of this invention to provide an arm rest for motor vehicles which may readily be mounted in the most suitable position relative to either arm of the driver or other occupants of a motor vehicle.

It is a further object of the invention to provide an arm rest of the above-stated character which may quickly and easily be adjusted whereby to most comfortably support a vehicle occupant's arm, regardless of the length thereof.

It is a still further object of the invention to provide an arm rest for a vehicle which embodies a cushioned base or arm per se and a support therefor, which is so shaped as to removably engage the back of a seat of the vehicle in any desired location thereon.

It is a still further object of the invention to provide an arm rest for motor vehicles which is simple in construction, neat in appearance, comfortable in use, and which is capable of being manufactured and sold at relatively low cost.

For a more complete understanding of the nature and objects of the invention, reference should be had to the following detailed description, taken in connection with the accompanying drawings, wherein—

Fig. 1 is a fragmental perspective view of the interior of a motor vehicle disclosing the use of the novel arm rest in connection therewith;

Fig. 2 is a rear elevation of the improved arm rest, in a preferred embodiment thereof;

Fig. 3 is a side elevation of the improved arm rest;

Fig. 4 is a top plan view of the base of the arm rest, particularly disclosing the means for effecting an adjustment of the base relative to the support therefor;

Fig. 5 is a sectional view in a plane represented by the line 5—5 in Fig. 4, a portion of the support being shown;

Figs. 6 to 9, inclusive, and Fig. 11 are rear elevational views of modified forms of supports;

Fig. 10 is a similar view showing the support of Fig. 2 in unattached position;

Fig. 12 is a perspective view; and

Fig. 13 is a rear elevational view of modified forms of the invention.

Referring now in detail to the drawings by reference characters, and wherein like characters designate like parts, 10 designates the base or arm rest per se and 11 designates the support or base suspending member.

The base 10, in a preferred construction thereof, comprises a block 12, which, while adapted to be constructed from any desired material, is preferably constructed of wood and is of generally rectangular formation in plan with the front end thereof rounded, as is clearly indicated in Fig. 4.

The block 12 is provided with a pair of laterally spaced apertures 13 adjacent the rear end thereof and which extend through the block from opposite faces thereof or may extend only part way through the block.

The block is further provided with apertures 14 which extend into the block from the rear end thereof and centrally intersect the apertures 13.

A nut 15 is force-fitted into each aperture 13 with its axis in alignment with the axis of the corresponding aperture 14.

A set-screw 16 is threaded into each nut 15 with the heads of the screws in engagement with an adjustable binding plate 17.

The plate 17 is provided with a depression 18 laterally outwardly of each screw 16 for engagement with the arms of the support 11, later described. The support 11 is preferably constructed from a single length of metal, which may be of round or flat cross section with the ends of such length suitably secured together, as by buttwelding at any desired point in the completed support.

The support, in a preferred form, comprises a pair of laterally spaced curved arms 20, which, in side elevation, are substantially of the contour of the outer surface of the back of a motor vehicle seat, as is indicated in Fig. 1.

The arms 20 at the upper ends thereof merge into a cross member 21 and at the lower ends thereof merge into a cross member 22. The arms 20 of the support 11 engage within the depressions 18 of the plate 17 and are bound between the plate and adjacent end of the block 12 upon tightening the screws 16.

The arms 20 in front or rear elevation flare outwardly from the cross member 22 to the cross member 21 but are sufficiently yieldable to permit engagement with the depressions 18 throughout a substantial length of the arms, whereby, upon loosening screws 16, the base 10 may be slid upwardly or downwardly on the arms 20 for any desired adjustment, after which the screws are tightened to bind the arms between the block 12 and plate 17.

The block 12 is neatly and comfortably upholstered, as is indicated at 23, the outer cover preferably extending over the rear end of the block behind the binding plate 17.

The arm rest, as hereinbefore disclosed, is readily adapted for removably engaging the back of a motor vehicle seat S in any desired location thereon, as is clearly obvious from Fig. 1 of the drawings, the arms 20 engaging the back of the seat with the upper curved ends thereof hooked over the top of the seat.

Thus, it will be readily appreciated that the arm rest may be positioned either at the right or left of the driver or other occupant of the vehicle for supporting or resting either arm and, of course, two or more such rests may be used in the vehicle, if desired.

Furthermore, the adjustable connection between the base 10 and support 11 readily provides for positioning the base at the most comfortable arm-resting position.

While it is preferred to construct the support 11 in the manner above described, the invention is not limited thereto, as such support may be of various other forms, as is indicated in Figs. 6 to 9, inclusive, and Fig. 11.

According to Fig. 6, the support 11a comprises arms 20 connected at their lower ends by a cross member 22a and with the upper free ends of the arms 20a rolled, as indicated at 25.

According to Fig. 7, the arms 20 are free at their upper ends and connected at their lower ends by a looped cross member 22b.

According to Fig. 8, the arms 20 are free at their lower ends and rolled, as indicated at 26, while their upper ends are connected by the cross member 21.

The structure of Fig. 9 is similar to that of Fig. 8, except that the lower ends of the arms 20 directly merge into the relatively large loops or eyes 27.

Fig. 10 discloses the form of support indicated in Figs. 2 and 3, showing the arms 20 as being straight before being clamped to block 12 by plate 17.

The support, according to Fig. 11, is similar to that of Fig. 10, except that the upper cross member 21a includes a loop 28.

Thus, it will be seen that the support 11 may assume various forms, it being essential only that the support conforms to the back of a vehicle seat and includes upper curved ends for hooking over the top of such back of the seat.

It may be found desirable to be able to move the base 10 toward a vertical position, as upon entering or emerging from a vehicle, and accordingly, the base 10 may be connected to the support 11 by means of a suitable hinge 30, as indicated in Fig. 12.

The immovable leaf of the hinge may be secured to the block 12 by means of screws and nuts, similar to those indicated at 16 and 15, respectively, or such leaf may include a tongue 31 engaging and suitably secured to the bottom of the block, the screw heads, of course, being countersunk in the hinge leaf.

The support may be fixed to the movable leaf of the hinge, or it may be adjustably secured thereto, as by a plate 32, similar to the plate 17, as is indicated in Fig. 13.

While I have disclosed only certain specific embodiments of my invention, the same are to be considered as illustrative only, and not restrictive, the scope of the invention being defined in the subjoined claims.

What I claim and desire to secure by U. S. Letters Patent is:

1. A support adapted to adjustably hold an arm-supporting base, said support comprising a pair of connected laterally spaced arms curved to conform with and engage the back of a seat of a vehicle and being of hook form at their upper ends for engagement over the top of said back of the seat, said arms being yieldable and converging downwardly from their upper ends, said yieldable arms permitting adjustment of said arm-supporting base lengthwise of said arms.

2. A support adapted to adjustably hold an arm-supporting base, said support comprising a pair of laterally spaced arms and a transverse member connecting said arms, said arms being curved to conform with and engage the back of a seat of a vehicle and being of hook form at their upper ends for engagement over the top of said back of the seat, said arms being yieldable and converging downwardly from their upper ends, said yieldable arms permitting adjustment of said arm-supporting base lengthwise of said arms.

ALBERT P. FALL.